United States Patent
Schwenk

(10) Patent No.: US 7,035,405 B1
(45) Date of Patent: Apr. 25, 2006

(54) METHOD FOR ESTABLISHING A COMMON KEY BETWEEN A CENTRAL STATION AND A GROUP OF SUBSCRIBERS

(75) Inventor: Joerg Schwenk, Dieburg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/807,176

(22) PCT Filed: Sep. 22, 1999

(86) PCT No.: PCT/EP99/07052

§ 371 (c)(1),
(2), (4) Date: Oct. 12, 2001

(87) PCT Pub. No.: WO00/22776

PCT Pub. Date: Apr. 20, 2000

(30) Foreign Application Priority Data

Oct. 9, 1998  (DE) ................................ 198 47 944

(51) Int. Cl.
*H04L 9/30* (2006.01)
(52) U.S. Cl. ....................................................... 380/29
(58) Field of Classification Search ................ 713/180; 380/279, 278, 29
See application file for complete search history.

(56) References Cited

U.S. PATENT DOCUMENTS

| 5,764,767 | A | * | 6/1998 | Beimel et al. | ............... | 713/180 |
| 5,903,649 | A | * | 5/1999 | Schwenk | .................... | 713/180 |
| 6,215,878 | B1 | * | 4/2001 | Harkins | ....................... | 380/281 |

FOREIGN PATENT DOCUMENTS

| CH | 6 78 134 | 7/1991 |
| DE | 195 38 385.0 | 4/1997 |
| EP | 0 281 224 | 9/1988 |
| EP | 0 460 538 | 12/1991 |
| EP | 0 511 420 | 11/1992 |
| EP | 0 723 348 | 7/1996 |
| EP | 0 768 773 | 4/1997 |

OTHER PUBLICATIONS

Laih, C-S et al., "On the design of conference key distribution systems for the broadcasting networks", IEEE INFOCOM '93, The Conference on Computer Communications Proceedings, Twelfth Annual Joint Conference of the IEEE Computer and Communications Societies, Networking: Foundation for the Future (CAT. No. 93CH3264-9), Mar. 28 - Apr. 1, 1993, vol. 3, pp. 1406-1413.

Diffie, W., et al., "New Directions in Cryptography", IEEE Transactions on Information Theory, Nov. 1976, vol. IT-22, No. 6, pp. 644-654.

JP 63-05236, In: Patent Abstracts of Japan, Mar. 5, 1988, Japan.

Beutelspacher, Schwenk, Wolfenstetter, "Moderne Verfahren der Kryptographie" ($2^{nd}$ ed.), Vieweg Publishers, Wiesbaden, 1998.

Burmester, M., et al., "A Secure and Efficient Conference Key Distribution System", Advances in Cryptology, EUROCRYPT '94, Workshop on the Theory and Application of Cryptographic Techniques, Proceedings of Eurocrypt '94, Perugia, Italy, May 9-12, 1994, pp. 275-286.

Steiner, M., et al. "Diffie-Hellman Key Distribution Extended to Group Communication", $3^{rd}$ ACM Conference on Computer and Communications Security, Proceedings of $3^{rd}$ ACM Conference on Computer and Communications Security, New Delhi, India, Mar. 14-16, 1996, pp. 31-37.

* cited by examiner

*Primary Examiner*—Gregory Morse
*Assistant Examiner*—Andrew Nalven
(74) *Attorney, Agent, or Firm*—Kenyon and Kenyon LLP

(57) ABSTRACT

The present invention provides a method for generating a common key between a central station and a group of subscribers, e.g., at least three subscribers, exhibit the same standard of security as the DH method.

2 Claims, No Drawings

METHOD FOR ESTABLISHING A COMMON KEY BETWEEN A CENTRAL STATION AND A GROUP OF SUBSCRIBERS

FIELD OF THE INVENTION

The present invention is directed to a method for establishing a common key between a central station and a group of subscribers according to the definition of the species in the independent claim.

BACKGROUND INFORMATION

There are many diverse encryption methods in the related art, and these methods have gained in commercial importance. They are used for transmitting information over generally accessible transmission media. However, only the owner of a cryptographic key is able to read this information in plain text.

A known method for establishing a common key via insecure communication channels is, for example, the W. Diffie and W. Hellman method (see DH method, W. Diffie and M. Hellmann; see "New Directions in Cryptography", IEEE Transactions on Information Theory, IT-22(6):644-654, November 1976).

The Diffie-Hellmann key exchange [DH76] is based on the fact that it is virtually impossible to calculate logarithms modulo a large prime number p. Alice and Bob take advantage of this fact in the example illustrated below, by each secretly choosing a number x and y, respectively, smaller than p (and prime to p-1). They then send each other (consecutively or simultaneously) the x-th (and, respectively, y-th) power of a publicly known number $\alpha$. From the received powers, they are able to calculate a common key $K:=\alpha^{xy}$ by again performing an exponentiation with x and y, respectively. An attacker, who sees only $\alpha^x$ and $\alpha^y$, is not able to calculate K therefrom. (The method known today to do so would involve first calculating the logarithm, e.g. of $\alpha^x$ to the base a modulo p, and then raising $\alpha^y$ to that power.)

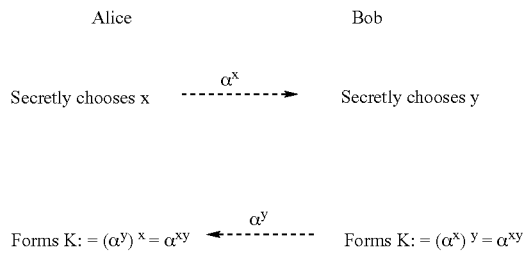

EXAMPLE OF THE DIFFIE-HELMANN KEY EXCHANGE

The problem that exists in the case of the DH key exchange is that Alice does not know whether she is actually communicating with Bob or with an impostor. In IPSec, this problem is solved by the use of public key certificates in which the identity of a subscriber is linked to a public key by a trustworthy authority. In this way, the identity of a conversation partner is can be verified.

The DH key exchange can also be implemented using other mathematical structures, such as finite fields $GF(2^n)$ or elliptical curves. With such alternatives, one can improve performance.

However, this method is only suitable for agreement of a key between two subscribers.

Various attempts have been made to extend the DH method to three or more subscribers (DH groups). M. Steiner, G. Tsudik, and M. Waidner provide an overview of the state of the art in "Diffie-Hellman Key Distribution Extended to Group Communication", Proc. 3rd ACM Conference on Computer and Communications Security, March 1996, New Delhi, India.

The following table illustrates an example where the DH method is extended to three subscribers A, B and C (in each case, calculations are mod p):

|  | A→B | B→C | C→A |
|---|---|---|---|
| 1st round | $g^a$ | $g^b$ | $g^c$ |
| 2nd round | $g^{ca}$ | $g^{ab}$ | $g^{bc}$ |

Once these two rounds have been carried out, each of the subscribers is able to calculate the secret key $g^{abc}$ mod p.

In all of these extensions, at least one of the following problems occurs:

The subscribers must be arranged in a certain manner, in the above example, for instance, in a circle.

The subscribers have no influence on the key selection vis-á-vis the central station.

The number of rounds is dependent on the number of subscribers.

As a general rule, these methods are difficult to implement and require substantial computational outlay.

Another method for establishing a common key is known from German Patent No. DE 195 38 385.0. In this method, however, the central station must know the secret keys of the subscribers.

Another approach is known from Burmester, Desmedt, "A Secure and Efficient Conference Key Distribution System", Proc. EUROCRYPT '94, Springer LNCS, Berlin 1994, where two rounds are required to generate the key, it being necessary to send n communications of a length of p=approx. 1000 bits through the central station for n subscribers in the second round.

A cryptographic method described as the (n,t) threshold method is also known. In an (n,t) threshold method, a key k can be decomposed into t parts (referred to as shadows), so that this key k can be reconstructed from any n of the t shadows (see Beutelspacher, Schwenk, Wolfenstetter: *Moderne Verfahren der Kryptographie* (2nd edition), Vieweg Publishers, Wiesbaden, 1998).

In IEEE Infocom '93, The Conference on Computer Communications Proceedings, Twelfth Annual Joint Conference of the IEEE Computer and Communications Societies, Networking: Foundation for the Future (cat. no. 93CH3264-9) (Mar. 28, 1993), vol. 3, pp. 1406–1413, "On the Design of Conference Key Distribution Systems for the Broadcasting Networks", a method is described for establishing a common key between a central station (chairman) and a group of n subscribers, where a threshold method is employed. In this approach, the central station (chairman) selects a common key. The method presupposes a secure channel between the chairman and the subscribers. A secure channel of this kind can be established, for example, using the DH method [DH76] indicated above, or a variant. However, for this, two communications are necessary for each subscriber, in order to negotiate a common key between the n subscribers and the central station (chairman), and to transmit a communication around the "public shadows".

Thus, altogether 2n+1 communications are required in order to establish the common key.

SUMMARY OF THE INVENTION

The present invention provides a method for generating a common key between a central station and a group of at least three subscribers exhibit the same standard of security as the DH method. The method can be based on a publicly known mathematical number group (G) and an element of the group g∈G of a high order. Each of the n subscribers generates a random number (i), calculates the value of $g^i$ in G, and transmits this value to the central station (z). In the central station (Z), a random number (z) is likewise generated, and the values $(g^i)^z$ in G are calculated. From these values, the shares are derived on the basis of a threshold method and, from these, a (n,2n−1) threshold method is constructed. The central station (Z) transmits the generated shares, together with the values $(g^i)^z$, to the n subscribers, who, using the (n,2n−1) threshold method, can reconstruct the key (k). The method in accordance with the present invention can be used for generating a cryptographic key for three or more subscribers.

DETAILED DESCRIPTION

The present invention provides a method for generating a common key between a central station and a group of at least three subscribers having the same security standards as the DH method. In this context, the method can be simple to implement and require minimal computational outlay.

The present invention is based, inter alia, on the same mathematical structures as the DH method and, therefore, has comparable security features. In comparison to the group DH methods proposed in known methods heretofore, it is substantially more efficient with respect to computational outlay and communication requirements.

The operating principle of the method according to the present invention is elucidated in the following. In this instance, the central station is denoted by Z, defined subscribers in the method by T1–Tn, and every single subscriber, who is not specifically named, by Ti. The publicly known components of the method include a publicly known mathematical group G, preferably the multiplicative group of all integral numbers modulo a large prime number p, and an element g of the group G, preferably a number 0<g<p having a high multiplicative order. For group G, however, other suitable mathematical structures can also be used, e.g., the multiplicative group of a finite field, or the group of the points of an elliptical curve.

The method can be carried out in three steps. In a first step, a communication in the form (Ti, $g^i$ mod p) can be sent by each subscriber Ti to the central station, i being a random number of subscriber Ti selected by a random number generator.

In a second work step, in central station Z:

A random number z is generated, and the number $(g^i)^z$ mod p is calculated for each subscriber Ti.

From these n numbers, n shares are then differentiated for n subscribers in central station Z, using a generally known (n, 2n−1) threshold method.

n−1 further shares $s^1$–$s^{n-1}$ are selected in central station Z and sent, together with the number $g^z$ mod p, to all subscribers T1–Tn.

In a third work step, the common key k can be calculated for each subscriber Ti,- $(g^z)i$ mod $p=(g^i)^z$ mod p being calculated;

from this, a share of the threshold method being differentiated; and on the basis of this share and $s^1$ . . . . $sn^{n-1}$, common key k being determined as the secret.

On the basis of a practical example, the method according to the present invention is elucidated in the following for three subscribers A, B, and C, as well as a central station Z. However, the number of subscribers can be increased to any desired number. In this example, the length of number p is 1024 bits; g has a multiplicative order of at least $2^{160}$.

An embodiment of the method in accordance with the present invention can be carried out as follows:

Subscribers A, B and C send $g^a$ mod p, $g^b$ mod p and $g^c$ mod p to central station Z.

$g^{az}$ mod p, $g^{bz}$ mod p and $g^{cz}$ mod p are calculated in central station Z, in each case the 128 least significant bits thereof being used as shares $S_A$, $S_B$ and, respectively, $S_C$. In central station Z, applying the (n,2,−1) threshold method, a $2^{nd}$ degree polynomial P(x), which passes through points (1, $s_A$), (2, $s_B$), and (3, $s_C$) and is uniquely defined by these points, is calculated over a finite field $GF(2^{128})$. Common key k is the point of intersection of this polynomial with the y-axis, i.e., k; =P(0). Central station Z transmits $g^z$ mod p, $s_1$:=P(4) and $s_2$:=P(5) to subscribers A, B and C.

For subscriber A, $(g^z)^a$ mod p is calculated. In the result, subscriber A having the 128 least significant bits of this value receives share $s_A$, which, together with shares $s_1$ and $s_2$ is sufficient to determine polynomial P'(x) and, thus, also key k. One proceeds analogously for subscribers B and C.

The method described above can use a minimum number of two rounds between subscribers T1–Tn and central station Z. In contrast to the Burmester and Desmedt approach, the outlay for character strings to be transmitted by the central station to the n subscribers can be reduced in the second round to a length of 128 bits per subscriber.

What is claimed is:

1. A method for establishing a common key k between a central station Z and a group of subscribers T1–Tn, comprising:

providing a publicly known mathematical group G and an element g∈G of a high order in the group G;

using a predetermined threshold method, wherein a random number i is generated by each subscriber Ti of the group of subscribers T1–Tn, and from the element g∈G and the random number i, the value $g^i$ is calculated by each subscriber Ti of the group of subscribers T1–Tn and transmitted to the central station Z; in the central station Z, a random number z is generated; from the random number z and the values $g^i$, the values $(g^i)^z$ in the group G are calculated, from the values $(g^i)^z$, n shares $(s_1, \ldots, s_n)$ of the threshold method are derived, and from the shares $(s_1, \ldots, s_n)$, an (n, 2n−1) threshold method is constructed, a secret of the (n, 2n−1) threshold method being the key k to be established; in the central station Z, n−1 further shares $(s_{n+1}, \ldots, s_{2n-1})$ differing from shares $(s_1, \ldots, s_n)$ are calculated together with the value $g^z$ in the group G and are transmitted to the group of subscribers T1–Tn; and for each subscriber Ti of the group of subscribers T1–Tn, the key k to be established is reconstructed so that from the value $g^z$ transmitted by the central station Z and the random number i of each subscriber Ti of the group of subscribers T1–Tn, the value $(g^z)^i$ in the group G is calculated, and that from the resulting value, applying the (n, 2n−1) threshold method, the share $s_i$ is derived, and that using the share $s_i$ and the further shares $(s_{n+1}, \ldots, s_{2n-1})$ transmitted by the central station Z, the key k is reconstructed.

2. The method of claim 1, wherein the group G and the element g are of such large proportions that a calculation of a discrete logarithm is virtually impossible.

* * * * *